No. 666,896. Patented Jan. 29, 1901.
R. R. ESSIG.
CORN PLANTER.
(Application filed Aug. 11, 1900.)
(No Model.) 3 Sheets—Sheet 1.

Witnesses:
Harry Frease
J. R. Bond

Inventor:
Ralph R. Essig.
F. W. Bond.
Per Attorney

THE NORRIS PETERS CO., PHOTO-LITHO., WASHINGTON, D. C.

No. 666,896. Patented Jan. 29, 1901.
R. R. ESSIG.
CORN PLANTER.
(Application filed Aug. 11, 1900.)
(No Model.) 3 Sheets—Sheet 2.
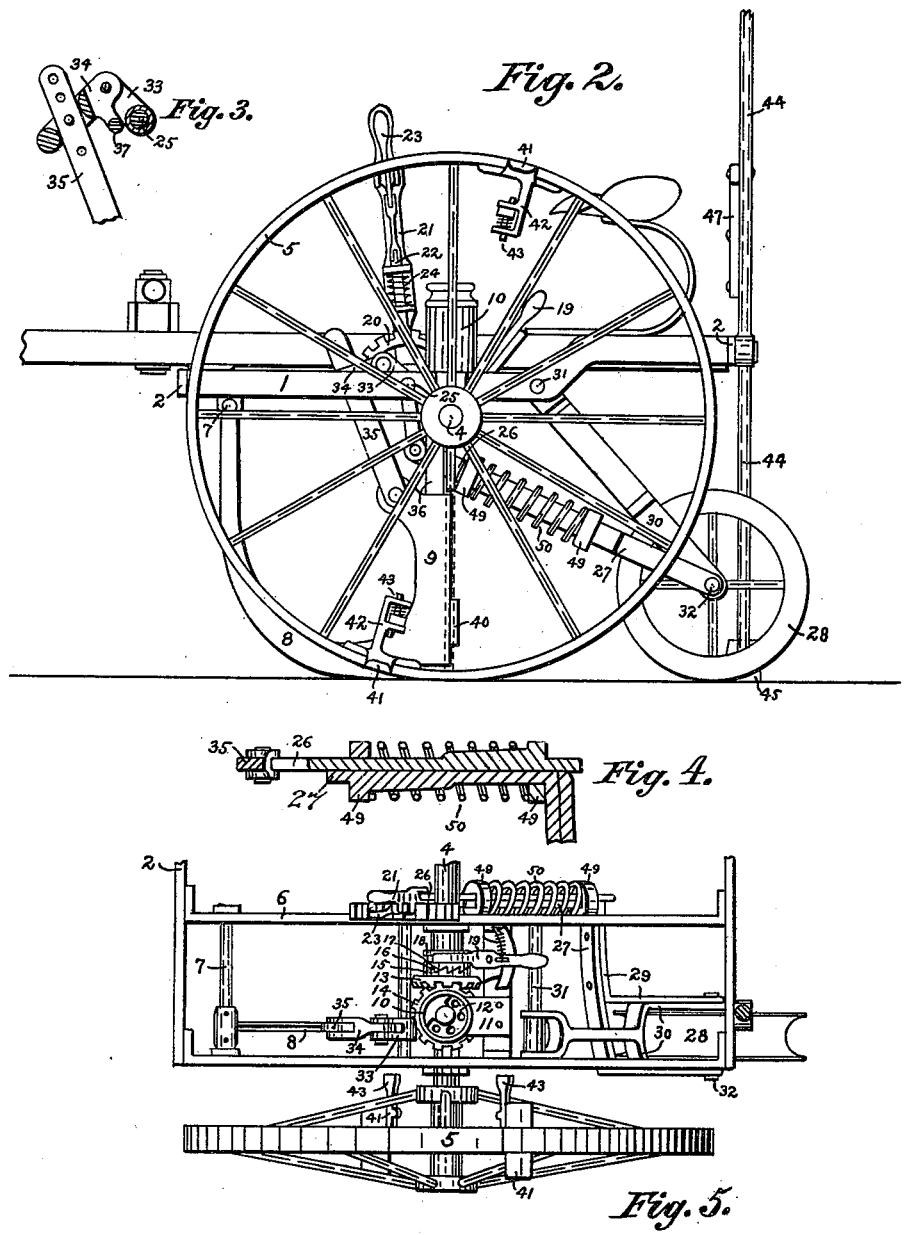

No. 666,896. Patented Jan. 29, 1901.
R. R. ESSIG.
CORN PLANTER.
(Application filed Aug. 11, 1900.)

(No Model.) 3 Sheets—Sheet 3.

Witnesses;
Harry Frease.
J. A. Bond

Inventor;
Ralph R. Essig,
Per F. W. Bond Attorney.

THE NORRIS PETERS CO., PHOTO-LITHO., WASHINGTON, D. C.

UNITED STATES PATENT OFFICE.

RALPH R. ESSIG, OF CANTON, OHIO.

CORN-PLANTER.

SPECIFICATION forming part of Letters Patent No. 666,896, dated January 29, 1901.

Application filed August 11, 1900. Serial No. 26,662. (No model.)

*To all whom it may concern:*

Be it known that I, RALPH R. ESSIG, a citizen of the United States, residing at Canton, in the county of Stark and State of Ohio, have invented certain new and useful Improvements in Corn-Planters; and I do hereby declare that the following is a full, clear, and exact description of the same, reference being had to the annexed drawings, making part of this specification, and to the figures of reference marked thereon, in which—

Figure 1:
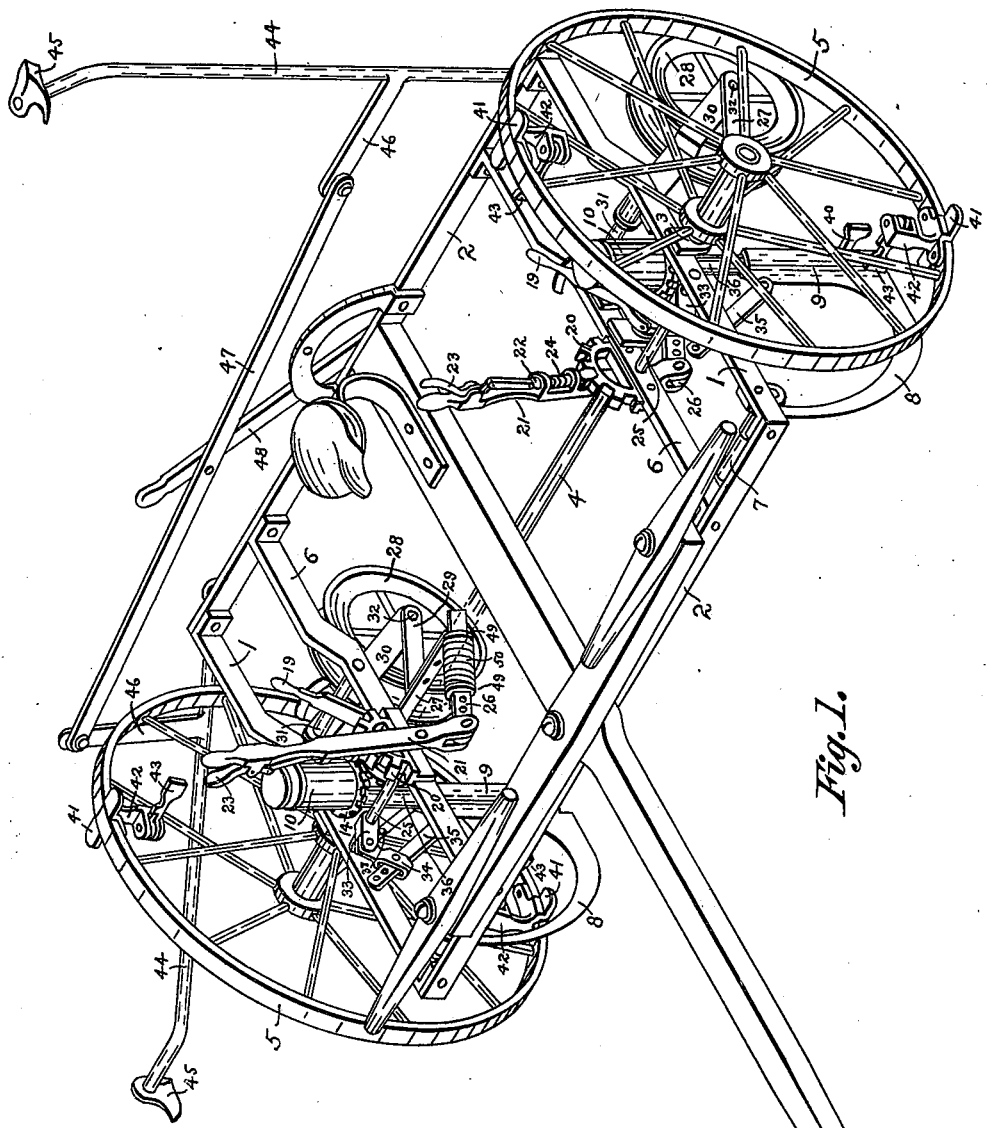
Figure 7:
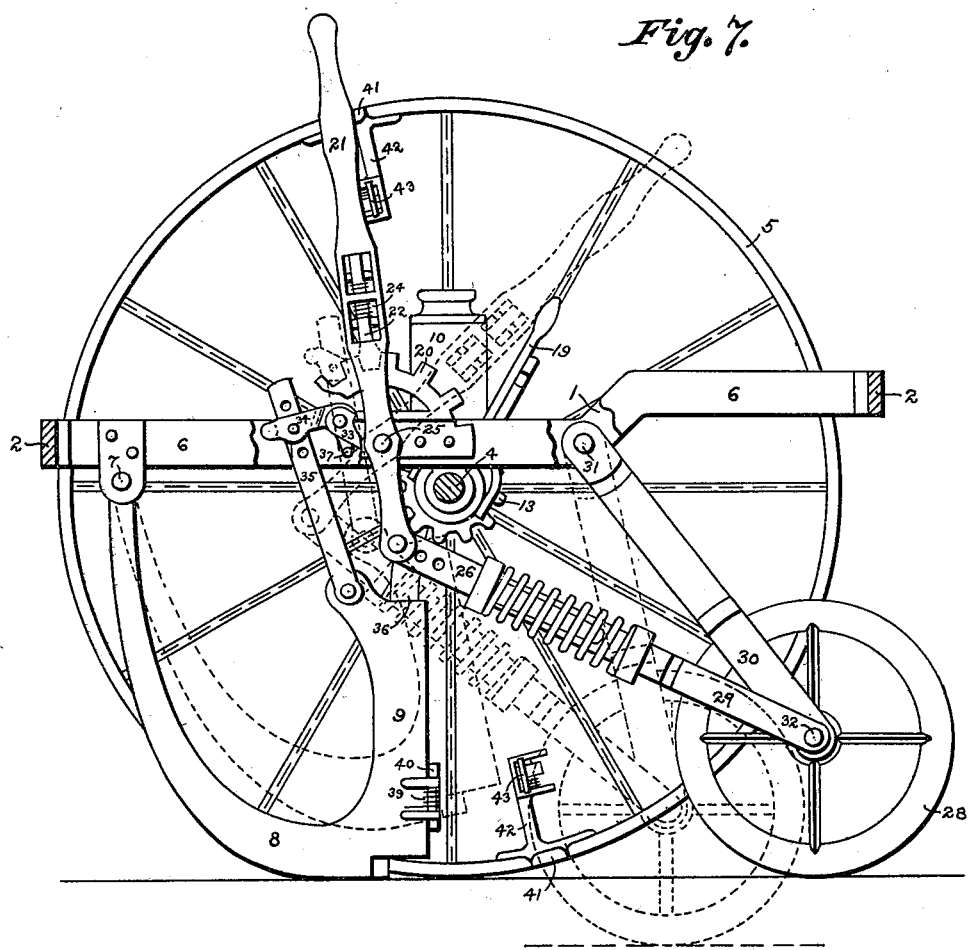

Figure 1 is a perspective view. Fig. 2 is an end view. Fig. 3 is a view showing the upper end of one of the furrow-blade links and illustrating a portion of its lifting mechanism. Fig. 4 is a longitudinal section of the forward portion of one of the corn-covering wheel-carrying arms, showing the spring properly located thereon. Fig. 5 is a top view showing one end of the planter proper. Fig. 6 is a transverse section of one of the grain-tubes, showing its valve and trip mechanism. Fig. 7 is a transverse section of the frame, showing the mechanism for moving the covering-wheels forward to receive the weight of the planter proper.

The present invention has relation to corn-planters designed and calculated to check the hills automatically without the use of a check-wire or its equivalent; and it consists in the novel arrangement hereinafter described, and particularly pointed out in the claims.

Similar numerals of reference indicate corresponding parts in all the figures of the drawings.

In the accompanying drawings, 1 represents the end members of the frame, and 2 the side members, said side members being connected together in any convenient and well-known manner, and when properly connected together said members constitute a rectangular structure. To the end members 1 are connected suitable bearings, such as 3, said bearings being for the purpose of holding in proper relative position the axle 4.

It will be understood that if desired the end members may be formed of a size sufficient to form the axle-bearings in said members, it being only a question of judgment as to whether the bearings are formed separate and connected to the end members or formed in said end members.

To the axle 4 are securely connected the traveling wheels 5, said traveling wheels being located and arranged substantially as shown in Fig. 1, and as shown they are located outside of the end members 1.

For the purpose of bracing the frame and at the same time providing a means for attaching the different parts of the planter the cross-bars 6 are provided, which cross-bars are located substantially as shown; but they may be differently located without departing from the nature of my invention.

To the front or forward portion of the frame proper are connected the bars 7, said bars being for the purpose of providing a means for pivotally connecting the forward and upper ends of the furrow blades or shoes 8, said furrow blades or shoes being located and arranged substantially as shown and extend downward and rearward, their lower ends being provided with the grain-tubes 9, which grain-tubes extend upward and are for the purpose of guiding the grain to the place of deposit.

To the frame of the planter proper are connected the grain-boxes 10, by means of suitable bars 11 or their equivalents.

At the bottom or lower ends of the grain-boxes 10 are located the rotating disks 12, said disks being of ordinary construction and form no particular part of the present invention within themselves, except that rotating disks must necessarily be employed to properly convey the grains of corn from the grain-boxes 10 to the grain-tubes 9.

Upon the axles 4 are loosely mounted the gear-wheels 13, which gear-wheels mesh with the gear-wheels 14, said gear-wheels 14 being for the purpose of communicating rotary motion to the disks 12. The gear-wheels 13 are provided with the flanges 15, which flanges are provided with inclined teeth 16, said inclined teeth being for the purpose of engaging the inclined teeth 17, formed upon the faces of the sliding collars 18, which sliding collars are so connected that they will rotate with the axle 4 at all times. When it is desired to communicate rotary motion to the disks 12, the sliding collars 18 are brought into such a position that the teeth 16 and 17 will engage each other, thereby imparting a rotary motion to the disks 12 by means of the gear-wheels 13 and 14, said sliding collars being moved back and forth by means of ordinary yoke-levers 19, said yoke-levers being connected in the usual manner for operating interlacing clutches.

To the brace-bars 6 or their equivalents are connected the toothed segments 20, which toothed segments are for the purpose of holding the levers 21 in proper adjustment by means of the sliding bars 22, which sliding bars are carried by the levers 21 and are operated by means of the ordinary L-shaped levers 23. For the purpose of normally holding the sliding bars 22 in proper engagement with the toothed segments 20 the springs 24 are provided and are located and arranged in the usual manner.

The levers 21 are securely connected to the rock-shafts 25, said levers being extended downward below said rock-shafts, as illustrated in the drawings, and their bottom or lower ends pivotally connected to the bars 26.

To the sides of the bars 6 are located the arms 27, said arms being substantially of the form shown, and, as shown, they extend laterally and rearwardly to the outer sides of the conveying-wheels 28. To the lateral portion of the arms 27 are connected the rearwardly-extending arms 29, said rearwardly-extending arms being located upon the inner sides of the covering-wheels 28.

Between the arms 27 and 29 are located the yokes 30, which yokes are pivotally connected at their upper ends to bars 31, said bars being located a short distance back of the main axle 4. The covering-wheels 28 are mounted upon the axles 32, to which axles 32 the arms 27 and 29 and the yokes 30 are connected, thereby forming a common connecting-point for the arms 27 29 and the yokes 30, said arrangement being for the purpose hereinafter described.

To the rock-shafts 25 are securely connected the short arms 33, and to said short arms 33 are pivotally connected the links 34, to which links are pivotally connected the lifting-bars 35, the bottoms or lower ends of said lifting-bars being pivotally connected to the grain-tubes 9, preferably at their upper forward ends.

From the grain-boxes 10 and below the disks 12 extend the flexible tubes 36, which flexible tubes are extended into the grain-tubes 9 and are for the usual purpose of conducting the grain from the grain-boxes proper to the grain-tubes 9. For the purpose of lifting the grain-tubes 9 by means of the levers 21, when said levers are moved backward, the pins or studs 37 are provided and are so located that they will strike against the under sides of the short arms 33, thereby preventing the links 34 from turning downward as the free ends of the short arms 33 are moved upward. This peculiar arrangement is also for the purpose of allowing a limited up-and-down movement of the furrow-blades 8 and the grain-tubes 9 independent of the levers 21, as it will be understood that a limited free independent movement of the links 34 will be permitted independent of the short arms 33—that is to say, said links are free to move upward a short distance when the furrow-blades strike any obstruction—this arrangement being for the purpose of allowing a yielding connection between the furrow-blades and grain-tubes and the machine proper to compensate for any irregularities that may be upon the surface of the ground over which the machine travels and at the same time providing a means for the shoes and grain-tubes to ride over small stones.

The grain-tubes 9 are each provided with the valves 38, (see Fig. 6,) which valves are held in a closed position by means of the springs 39, said springs being connected in such a manner that they will normally hold the valves 38 in a closed position. To the valves 38 are attached or formed integral therewith the arms 40, which arms extend laterally and are for the purpose hereinafter described.

To the traveling wheels 5 are connected the marker-shoes 41, which marker-shoes are for the purpose of determining the location of the hills of grain in the rows.

The marker-shoes 41 are each provided with the arms 42, to which arms are pivotally connected the valve trip-bars 43, said valve trip-bars being so connected and located that they will strike the valve-arms 40 as the traveling wheels 5 rotate, thus opening the valve 38 and allowing the grain to drop to the place of deposit, the springs 39 being for the purpose of automatically closing the valve 38 after the trip-bars 43 have passed the valve-arms 40. It will be understood that the valve trip-bars should be so adjusted and connected that they will be securely held in a lateral position during the time the planter proper is moved forward; but when the traveling wheels are moved backward the trip-bars should be free to turn upon their hinge connection as they pass the valve-arms 40 and be brought back by the springs 40ª.

In locating the marker-shoes upon the traveling wheels 5 they should be so located that the distance between the marker-shoes will be the same as the distance between the grain-tubes 9—that is to say, if the grain-tubes 9 are two feet apart the marker-shoes 41 should be two feet apart, the distance between the marker-shoes being taken upon the peripheries of the traveling wheels 5, this arrangement being for the purpose of properly spacing the rows in each direction.

In use the corn-planter proper in planting the first two rows is moved over the ground, and after the first two rows are planted the machine is turned around and properly set for the return trip, and for the purpose of placing the machine the proper distance from the first two rows planted the two marker-arms 44 are provided, the outer ends of which are each provided with the marker-shoes 45, said marker-shoes being so adjusted that they will indicate the proper distance of the machine to travel from the first two rows. The marker-arms 44 are pivotally connected to the frame proper or to the rear member 2 of the frame and are each provided with the right-angled arms 46, to which right-angled arms are pivotally connected the connecting-bar 47, and to said connecting-bar 47 is pivotally connected the shifting lever 48, said shifting lever being pivotally connected at its bottom or lower end to the rear bar 2 or its equivalent. For the purpose of bringing the marker-shoes 45 so as to bring one of said shoes into proper operative position the shoes should be shifted by means of their connecting-rods—that is to say, the shoe that was down should be moved or thrown up and the shoe that was up should be lowered, so as to come in proper contact with the ground at each turn of the planter for return trips.

For the purpose of properly starting the planter at the ends of the rows the marker-shoe 41 should be brought directly opposite or in line with the marks made by the return trip of the machine, and in order to do this properly the weight of the machine should be lifted from the traveling wheels, so that said traveling wheels are free to be rotated until the marker-shoes are brought into the proper position, after which the traveling wheels are permitted to carry the frame. In order to remove the weight of the planter proper from the traveling wheels, the levers 21 are moved backward at their upper ends, which in turn brings the covering-wheels 28 forward and elevates the frame, together with its different parts, so that the traveling wheels are free to be rotated. It will be understood that as the levers 21 are moved backward at their upper ends their lower ends will be moved forward, carrying with them the bars 26, 27, and 28 and the yokes 30, and by means of the yokes 30 the frame of the planter proper will be elevated. It will also be understood that at the same time the levers 21 are moved backward the furrow-blades and grain-tubes will be elevated by reason of the short arms 33, the links 34, and the connecting-bars 35.

In the drawings I have shown two levers 21 and two rock-bars 25, this construction being shown for the purpose of providing a means of lifting one end of the planter at one time; but should it be desired to provide a means for lifting the entire frame at a given time the rock-bars 25 may be dispensed with and a single bar extended through the frame and a single lever connected thereto, this construction being practically the same in principle as that illustrated.

After the traveling wheels 5 have been properly adjusted with reference to their marker-shoes the machine is properly set for a return trip, it being understood that the proper marker-arm 44 and the marker-shoe 45 are to be placed in operative position and the levers 21 moved forward at their upper ends to allow the machine proper to travel upon the wheels 5.

It will be understood that by locating the arms 26 and 27 side by side and separately connecting them together by means of the collars 49 and locating the interposed spring 50 between said collars a yielding connection will be given to the covering-wheels 28.

It will be understood that the device for tripping the valve contained in the grain-tube may be varied without departing from the nature of my invention, as the only object designed to be accomplished is to operate the valves by the rotation of the traveling wheels and axle, as it will be understood that the axle must rotate with the traveling wheels in order that the valves may be operated at the same time.

The marker-shoes 41 are to be so connected that they will properly mark the places where grain is deposited and the exact manner of connecting said markers to the wheels is immaterial.

Having fully described my invention, what I claim as new, and desire to secure by Letters Patent, is—

1. The combination of a frame, an axle journaled thereto and provided with traveling wheels fixed to the axle, said traveling wheels provided with marker-shoes located upon the peripheries of the traveling wheels, grain-tubes provided with valves and means for operating the valves, furrow-blades located in front of the grain-tubes and means for elevating the grain-tubes and furrow-blades, yokes pivoted at their upper ends and provided with covering-wheels, rods or bars yieldingly connected together their rear ends connected to the yokes carrying the traveling wheels, and a lever pivotally connected to the forward ends of the yielding bars, substantially as and for the purpose specified.

2. The combination of a frame, grain-boxes carried by the frame and provided with dropper-disks, means for rotating the dropper-disks, a toothed segment fixed to the frame, a lever fixed to a rock-shaft, a rock-arm fixed to the rock-shaft and provided with a pivoted link, means for limiting the downward movement of the pivoted link, a connecting-bar pivoted to the link, said connecting-bar yieldingly connected to an arm, said arm connected to the axle of the covering-wheel, an arm fixed to the arm connected to the axle of the covering-wheel and a yoke located between the arms and attached to the axle of the covering-wheel, said yoke connected at a fixed point at its upper end, and a covering-wheel, and means for moving the covering-wheel forward independent of the forward movement of the frame, substantially as and for the purpose specified.

3. The combination of a frame, an axle journaled thereto and traveling wheels fixed to the axle, furrow-blades connected to the frame, grain-tubes provided with valves, means for operating the valves, covering-wheels located in the path of the furrow-blades, yokes connected to the axles of the covering-wheels and pivoted at their upper ends at a fixed point, bars connected to the axle of the covering-wheels, a lever or levers fixed to a rock shaft or shafts, said rock shaft or shafts provided with arms, links pivotally connected to the rock-arms and yielding connecting-bars pivoted to the links carried by the rock-arms all arranged, substantially as and for the purpose specified.

4. The combination of a frame, grain-boxes carried by the frame and provided with dropper-disks, means for rotating the dropper-disks, a toothed segment fixed to the frame, a lever fixed to a rock-shaft, a rock-arm fixed to the rock-shaft and provided with a pivoted link, means for limiting the downward movement of the pivoted link, a connecting-bar pivoted to the link, said connecting-bar yieldingly connected to an arm, said arm connected to the axle of a covering-wheel, an arm fixed to the arm connected to the axle of the covering-wheel and a yoke connected between the arms and to the axle of a covering-wheel; said yoke connected at its upper end to the frame and a covering-wheel, substantially as and for the purpose specified.

In testimony that I claim the above I have hereunto subscribed my name in the presence of two witnesses.

RALPH R. ESSIG.

Witnesses:
F. W. BOND,
J. R. BOND.